US011173563B2

(12) United States Patent
Rozot

(10) Patent No.: US 11,173,563 B2
(45) Date of Patent: Nov. 16, 2021

(54) SYSTEMS AND METHODS FOR REDUCING THE SIZE OF A MATERIAL

(71) Applicant: Thierry Rozot, Valparaiso, IN (US)

(72) Inventor: Thierry Rozot, Valparaiso, IN (US)

( * ) Notice: Subject to any disclaimer, the term of this patent is extended or adjusted under 35 U.S.C. 154(b) by 65 days.

(21) Appl. No.: 16/592,441

(22) Filed: Oct. 3, 2019

(65) Prior Publication Data

US 2020/0108460 A1   Apr. 9, 2020

Related U.S. Application Data

(60) Provisional application No. 62/740,557, filed on Oct. 3, 2018.

(51) Int. Cl.
*B23K 7/10* (2006.01)
*B23K 7/00* (2006.01)

(52) U.S. Cl.
CPC .............. *B23K 7/003* (2013.01); *B23K 7/102* (2013.01)

(58) Field of Classification Search
CPC ................................ B23K 7/003; B23K 7/102
See application file for complete search history.

(56) References Cited

U.S. PATENT DOCUMENTS

| 5,312,091 | A | 5/1994 | Vogrin |
| 6,277,322 | B1 | 8/2001 | Lotz |
| 6,334,906 | B1 | 1/2002 | Donze et al. |
| 6,712,911 | B2 | 3/2004 | Donze et al. |
| 6,787,731 | B1 | 9/2004 | Prioretti et al. |
| 7,007,737 | B2 | 3/2006 | Mexin |
| 7,377,987 | B2 | 5/2008 | Goffette |
| 7,378,051 | B2 | 5/2008 | Mexin |
| 7,806,029 | B2 | 10/2010 | Rozot et al. |
| 8,402,868 | B2 | 3/2013 | Rozot et al. |
| 10,926,429 | B2 * | 2/2021 | Rozot .................. B23K 26/38 |

(Continued)

FOREIGN PATENT DOCUMENTS

| EP | 1342527 | 9/2003 |
| KR | 20130062137 | 6/2013 |

(Continued)

OTHER PUBLICATIONS

International Search Report dated Jan. 22, 2020 for International Application No. PCT/US2019/054544, (3 pages).

*Primary Examiner* — Scott R Kastler
(74) *Attorney, Agent, or Firm* — Hartman Global IP Law; Gary M. Hartman; Domenica N. S. Hartman

(57) ABSTRACT

Automated systems and methods for making cuts in large materials, particularly to trim and reduce the sizes of steel plates and slabs and produce therefrom one or more reduced-size pieces, optionally with the ability to reduce or avoid the need to perform a separate deburring operation on the materials after undergoing such cuts. Such a system includes multiple support units aligned in a longitudinal direction of a foundation and longitudinal and cross cutting units translatable in the longitudinal direction for performing, respectively, longitudinal and lateral cuts in a material. The support units are independently translatable in the longitudinal direction and each support unit has a crossmember that extends in the lateral direction, is adapted to at least partially support the material, and is operable to be raised and lowered in the vertical direction while the material is supported by the crossmembers.

24 Claims, 17 Drawing Sheets

(56) References Cited

U.S. PATENT DOCUMENTS

| | | |
|---|---|---|
| 2005/0067054 A1 | 3/2005 | Alexin |
| 2006/0127192 A1 | 6/2006 | Robinson |
| 2012/0315827 A1 | 12/2012 | Edman et al. |
| 2013/0203320 A1 | 8/2013 | Ghalambor |
| 2015/0063933 A1 | 3/2015 | Faessler et al. |
| 2017/0056997 A1* | 3/2017 | Schutz ................ B22D 11/126 |
| 2017/0129119 A1 | 5/2017 | Rozot |
| 2020/0108460 A1* | 4/2020 | Rozot .................... B23K 7/003 |
| 2020/0346305 A1* | 11/2020 | Rozot .................... B23K 26/38 |

FOREIGN PATENT DOCUMENTS

| | | |
|---|---|---|
| WO | 2006/138605 | 12/2006 |
| WO | 2014/208069 | 2/2017 |
| WO | 2018002670 | 1/2018 |

* cited by examiner

SYSTEMS AND METHODS FOR REDUCING THE SIZE OF A MATERIAL

CROSS-REFERENCE TO RELATED APPLICATIONS

This application claims the benefit of U.S. Provisional Application No. 62/740,557, filed Oct. 3, 2018, the contents of which are incorporated herein by reference.

BACKGROUND OF THE INVENTION

The invention relates to systems and methods for reducing the size of a material. The invention particularly relates to automated systems and methods for making cuts in large masses of materials, including but not limited making longitudinal and lateral cuts to trim and reduce the sizes of steel plates and slabs and produce therefrom reduced-size pieces, preferably with the ability to reduce and in some cases avoid the need to perform a separate deburring operation on the materials after undergoing such cuts.

In plate mills, after a plate has been rolled to the desired gage thickness, the longitudinal and end edges of the plate are ordinarily not straight. For example, the longitudinal edges are often wavy and the end edges are often rounded. Consequently, the plate must be cut (trimmed) to create straight edges as well as undergo a size reduction to acquire desired dimensions for the plate. In practice, up to about 4 inches (about 10 cm) of material are often removed from each longitudinal edge and up to about 1.5 to 2 feet (about 45 to 60 cm) of material are often removed from each end edge. For gages under 2 to 2.5 inches (about 5 to 6 cm), a laser or plasma arc torch is often used to cut steel plates, whereas an oxy-fuel (flame) cutting torch is typically used to cut plates of greater thicknesses. These processes often result in burrs along the edges formed by the cut, and removal of such burrs is usually desirable or necessary. In most plate mills, the cutting operation and burr removal (deburring) process are done manually, the latter being performed with a slash hammer or grinding machine and therefore very labor intensive.

BRIEF DESCRIPTION OF THE INVENTION

The present invention provides automated systems and methods for making cuts in large masses of materials, particularly longitudinal and lateral cuts to trim and reduce the sizes of steel plates and slabs and produce therefrom one or more reduced-size pieces, preferably with the ability to reduce and in some cases avoid the need to perform a separate deburring operation on the materials after undergoing such cuts.

According to one aspect of the invention, an automated cutting system for reducing the size of a material includes a foundation, multiple support units aligned in the longitudinal direction of the foundation, at least one longitudinal cutting unit translatable in the longitudinal direction, and at least one cross cutting unit translatable in the longitudinal direction. The foundation has a longitudinal direction along an X axis of the cutting system and corresponding to an X-axis of the material, a lateral direction along a Y axis of the cutting system and corresponding to a Y axis of the material, a vertical direction along a Z axis of the cutting system and corresponding to a Z axis of the material, and at least a first support wall. The support units are independently translatable in the longitudinal direction and each of the support units comprises a crossmember that extends in the lateral direction, is adapted to at least partially support the material, and is operable to be raised and lowered in the vertical direction while the material is supported by the crossmembers. The longitudinal cutting unit comprises at least one torch adapted for performing a longitudinal cut in the material along the X axis thereof while the material is supported by the crossmembers of the support units. The cross cutting unit comprises at least one torch adapted for performing a lateral cut in the material along the Y-axis thereof while the material is supported by the crossmembers of the support units.

Other aspects of the invention provide for the inclusion of deburring means associated with the longitudinal and/or cross cutting units for simultaneously deburring the cuts as they are being produced.

Another aspect of the invention is a method of reducing the size of a material to produce therefrom one or more reduced-size pieces using an automated cutting system comprising the elements described above.

Technical effects of systems and methods as described above preferably include the ability to perform automated cutting operations and preferably also deburring operations on a plate with a single apparatus that reduces if not avoids the laborious task of removing burrs by hand.

Various aspects and advantages of this invention will be appreciated from the following detailed description.

DETAILED DESCRIPTION OF THE INVENTION

FIGS. 1 through 9 represent a nonlimiting embodiment of an automated cutting system adapted to make longitudinal (X axis) and lateral (Y axis) cuts in a large mass of material, for example, to trim and/or reduce the size of a metal plate or slab by making through-thickness (Z axis) cuts in the plate or slab, while also reducing if not avoiding the need to perform a separate and subsequent deburring operation on the material after undergoing such cuts. The cutting system is particularly well suited for performing cutting and deburring operations on steel plates and, as a matter of convenience, will be shown and described in reference to cutting steel plates, though it should be understood that the cutting system is not so limited.

Figure 6:
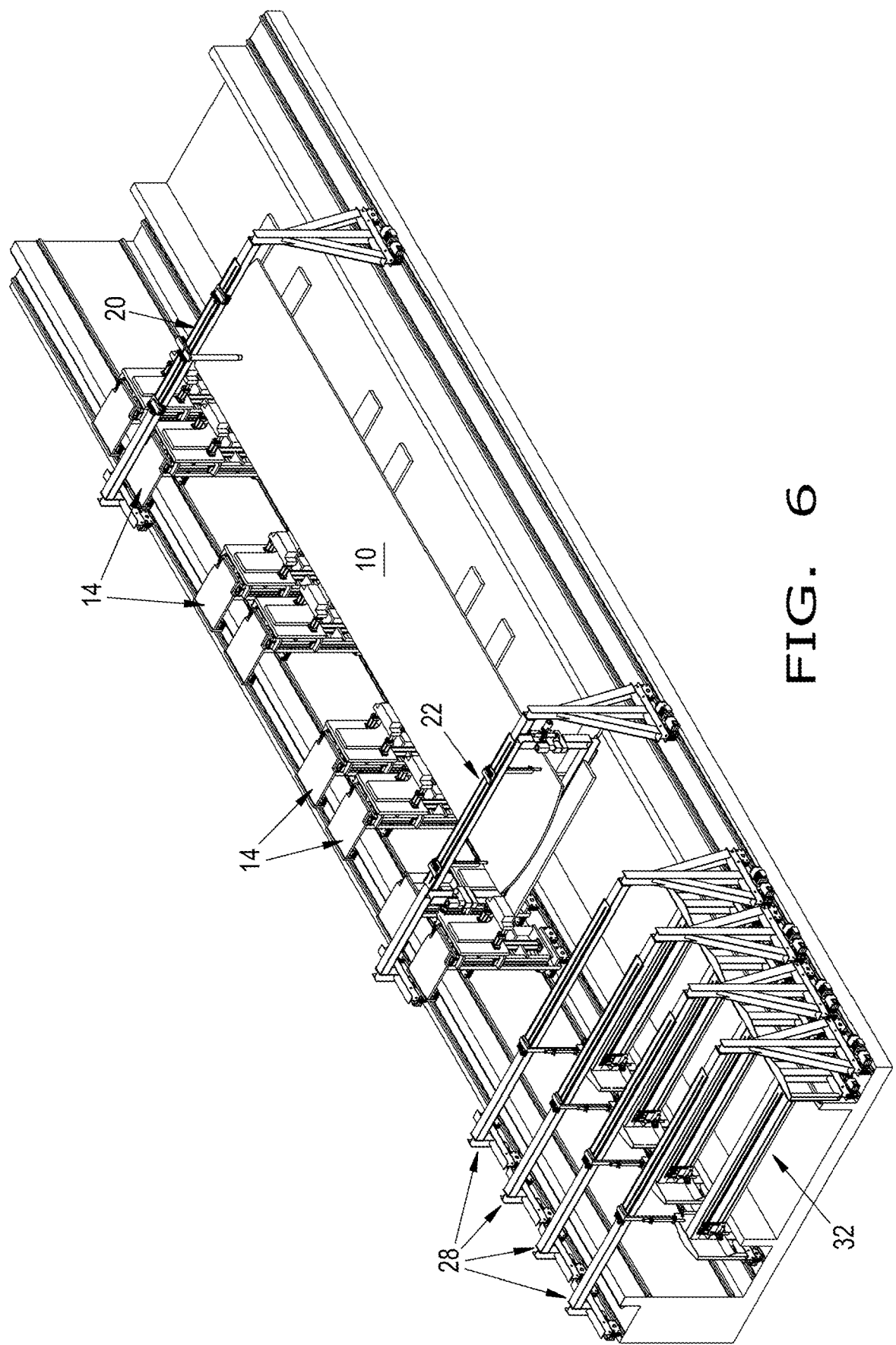
Figure 7:
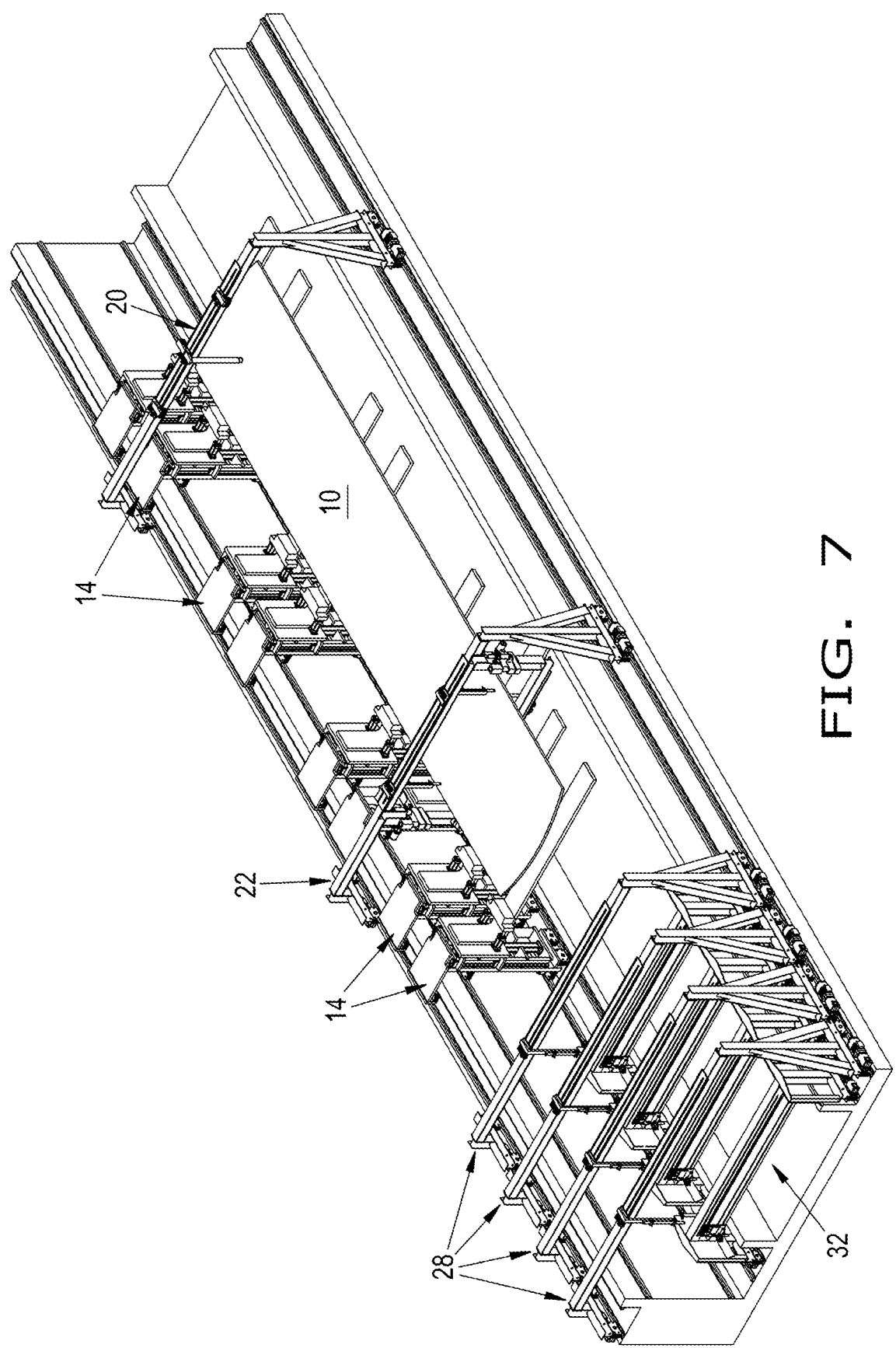
Figure 8:
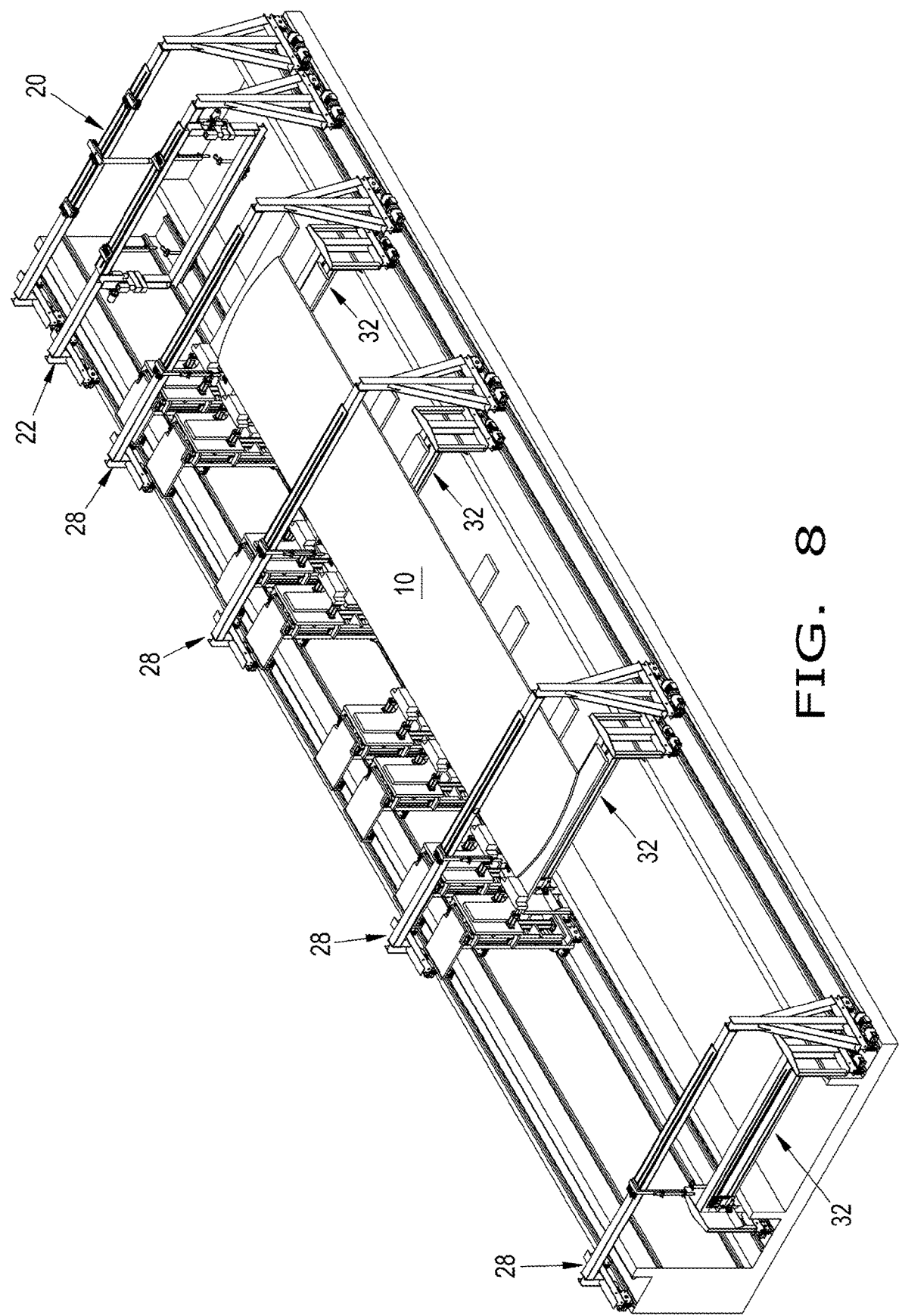
FIG. 8 is a perspective view showing the plate of FIGS. 2A and 2B in preparation for undergoing cross cuts to simultaneously remove material from the end edges of the plate and cut a remaining portion of the plate into two reduced-size plates.

The cutting system represented FIGS. 1 through 9 is configured as a fully-automated cutting and deburring system that can perform longitudinal and cross cuts to yield substantially burr-free plates having a range of gage thicknesses. The nonlimiting embodiment of the cutting system represented in the drawings is capable of performing at least two longitudinal cuts in a plate 10 (FIGS. 2A and 2B) in one operation (FIGS. 5, 6, and 7) and performing two or more lateral (cross) cuts in the plate 10 in another operation (FIG. 8). The cutting system can be used to perform multiple longitudinal cuts and cross cuts to selectively remove material from the longitudinal and end edges of the plate 10, and/or perform one or more cross cuts to produce one or more reduced-size pieces (plates) from a single plate 10. The particular embodiment of the cutting system represented FIGS. 1 through 9 also has the capability to cut a sample from the plate 10 for testing purposes, for example, a 6×6 inch (about 15×15 cm) sample cut from the plate 10 near one of its longitudinal ends.

In the nonlimiting embodiment of FIGS. 1 through 9, the cutting system can be seen to comprise a foundation 12 on which various components of the cutting system are supported, including multiple (e.g., eight) support units 14 that are adapted to support the plate 10 within the cutting system. The foundation 12 can be generally described as having a longitudinal direction along an X axis of the cutting system, a lateral direction along a Y axis of the cutting system, and a vertical direction along a Z axis of the cutting system. These directions and axes of the cutting system and its foundation 12 also generally correspond to the longitudinal (X axis), lateral (Y axis), and vertical (Z axis) directions of the plate 10 once placed in the cutting system. The support units 14 are represented as aligned in the longitudinal direction of the foundation 12.

Figure 1:
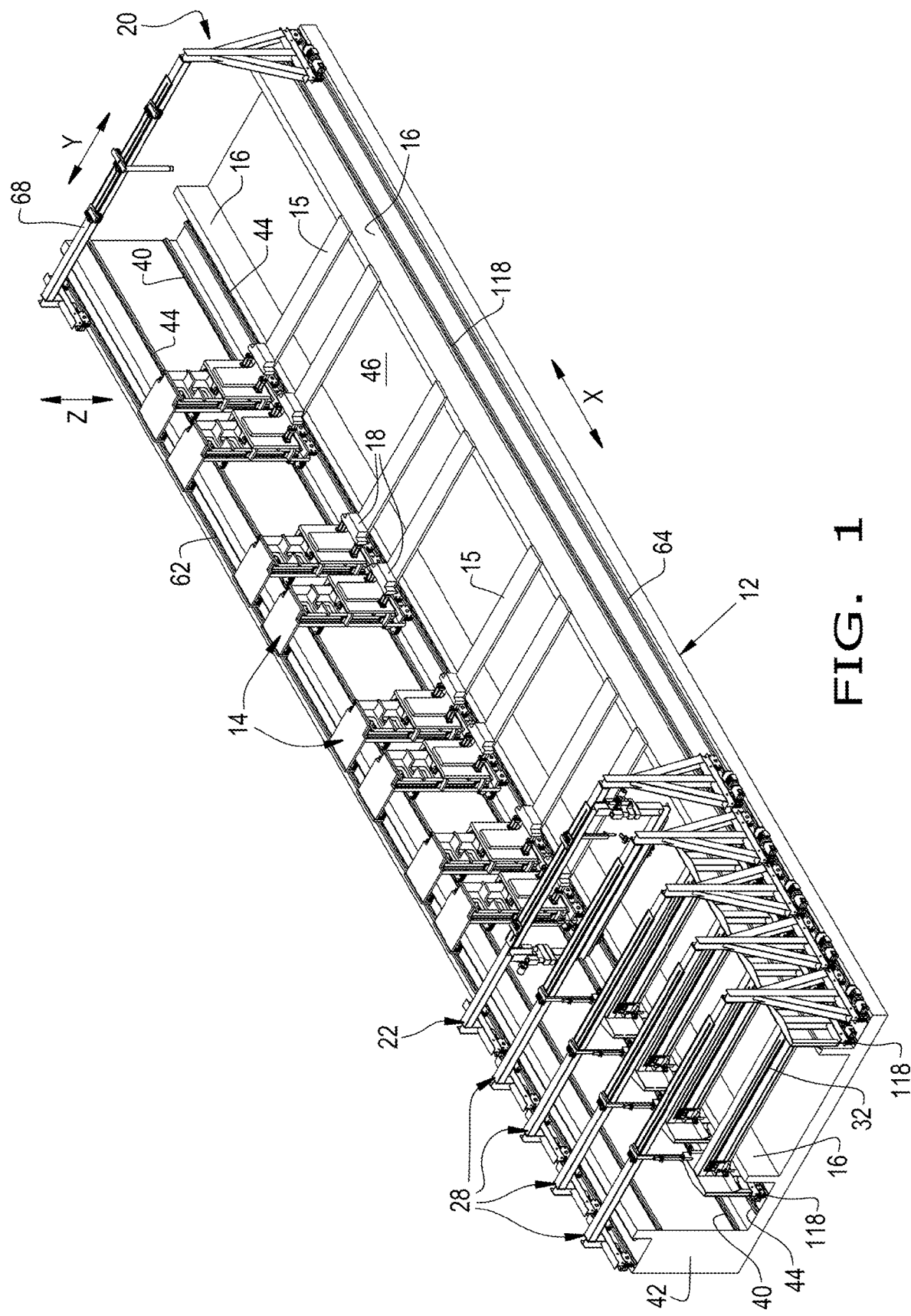
FIG. 1 is a perspective view of an automated cutting system for making cuts in a large mass of material according to a nonlimiting embodiment of the present invention.
Figure 2A:
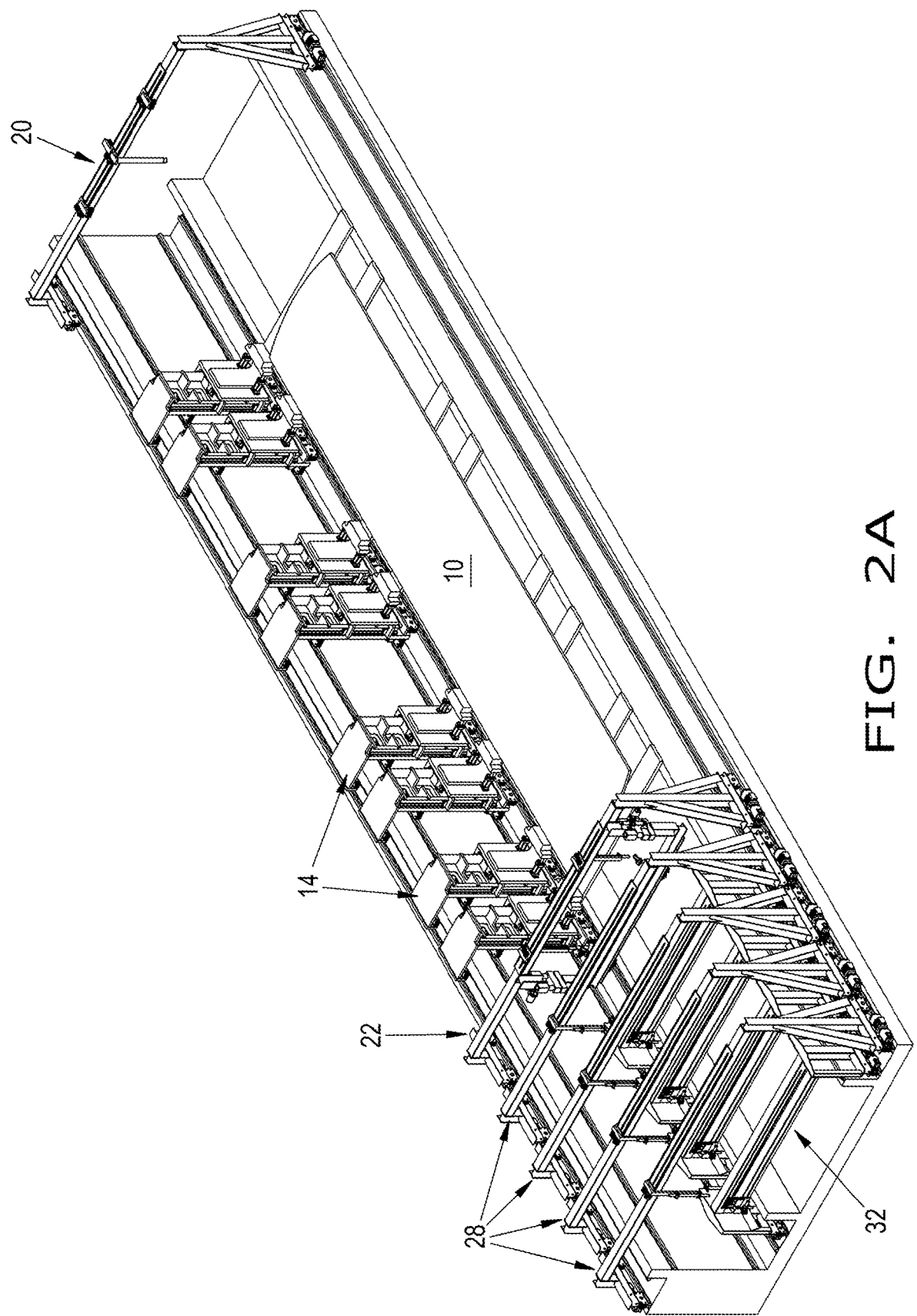
FIGS. 2A and 2B are, respectively, perspective and end views showing a steel plate immediately after being loaded into the cutting system of FIG. 1 in preparation of cutting and deburring operations to make longitudinal cuts in the plate, for example, to trim material from the longitudinal edges of the plate, and to make lateral cuts in the plate, for example, to trim material from the end edges of the plate and/or make one or more cross cuts in the plate.
Figure 2B:
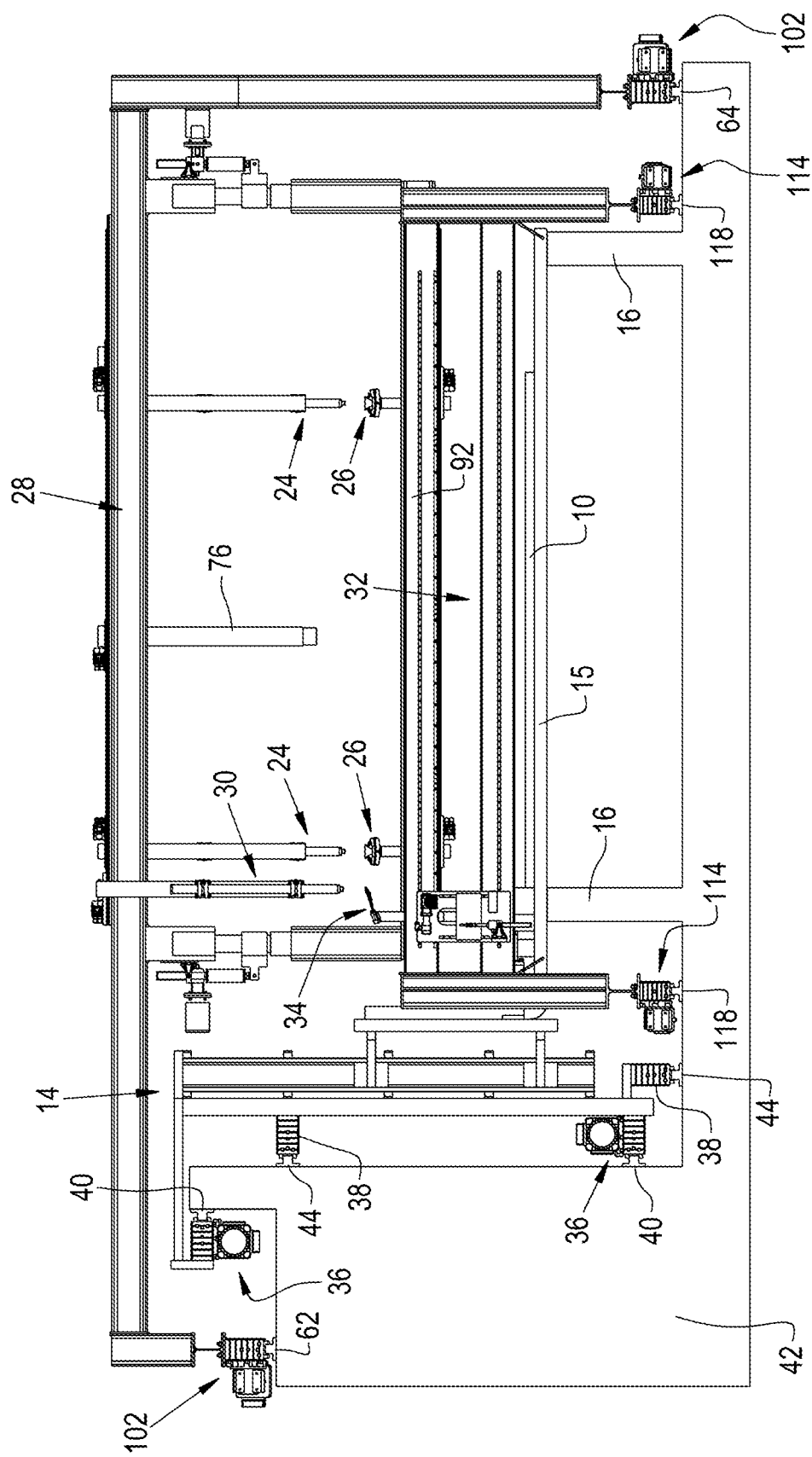

The support units 14 are capable of independent movement along the X axis of the cutting system, and therefore also along the X axis of the plate 10 positioned within the cutting system (FIGS. 2A through 8) in preparation for cutting and deburring operations to remove material from the longitudinal and end edges of the plate 10. The support units 14 are adapted for independent movement along the X axis to adjust for the longitudinal length of the plate 10 and the positions of cuts to be made in the plate 10. The longitudinal (X axis) position of each support unit 14 is preferably adjusted before loading the plate 10 on a crossmember 15 of the support unit 14, which extends in the lateral (Y axis) direction of the cutting system. Each support unit 14 is preferably capable of moving its crossmember 15 in the vertical (Z axis) direction of the cutting system and plate 10 to raise and lower the plate 10 to be cut. As an example, FIGS. 1, 2A, and 2B depict the crossmembers 15 of the support members 14 resting on lower support walls 16 of the foundation 12 before and after loading the plate 10, and FIGS. 3 through 8 depict most or all of the crossmembers 15 raised off the support walls 16 before and during the cutting of the plate 10. Each support unit 14 has a loading position in which its crossmember 15 is in a lowermost position and rests on the support walls 16 of the cutting system's foundation 12 to stabilize the support units 14 and their crossmembers 15 during the loading and unloading process.

Each support unit 14 is also preferably equipped with a bumper 18 to minimize shock to the cutting system as the plate 10 is loaded and unloaded from the cutting system. The bumpers 18 are preferably capable of movement along the Y (lateral) axes of the cutting system and plate 10 so that the bumpers 18 can be extended toward the center of the cutting system prior to loading the plate 10 onto the crossmembers 15 of the support units 14, thereby in position to absorb impacts from the longitudinal edges of the plate 10, and then retracted after the plate 10 has been loaded onto the crossmembers 15 so that the longitudinal edges of the plate 10 can be accessed during the cutting operation.

Further aspects of the support units 14 can be appreciated from the various views shown in FIGS. 10A and 10B, discussed in more detail below.

Figure 3:
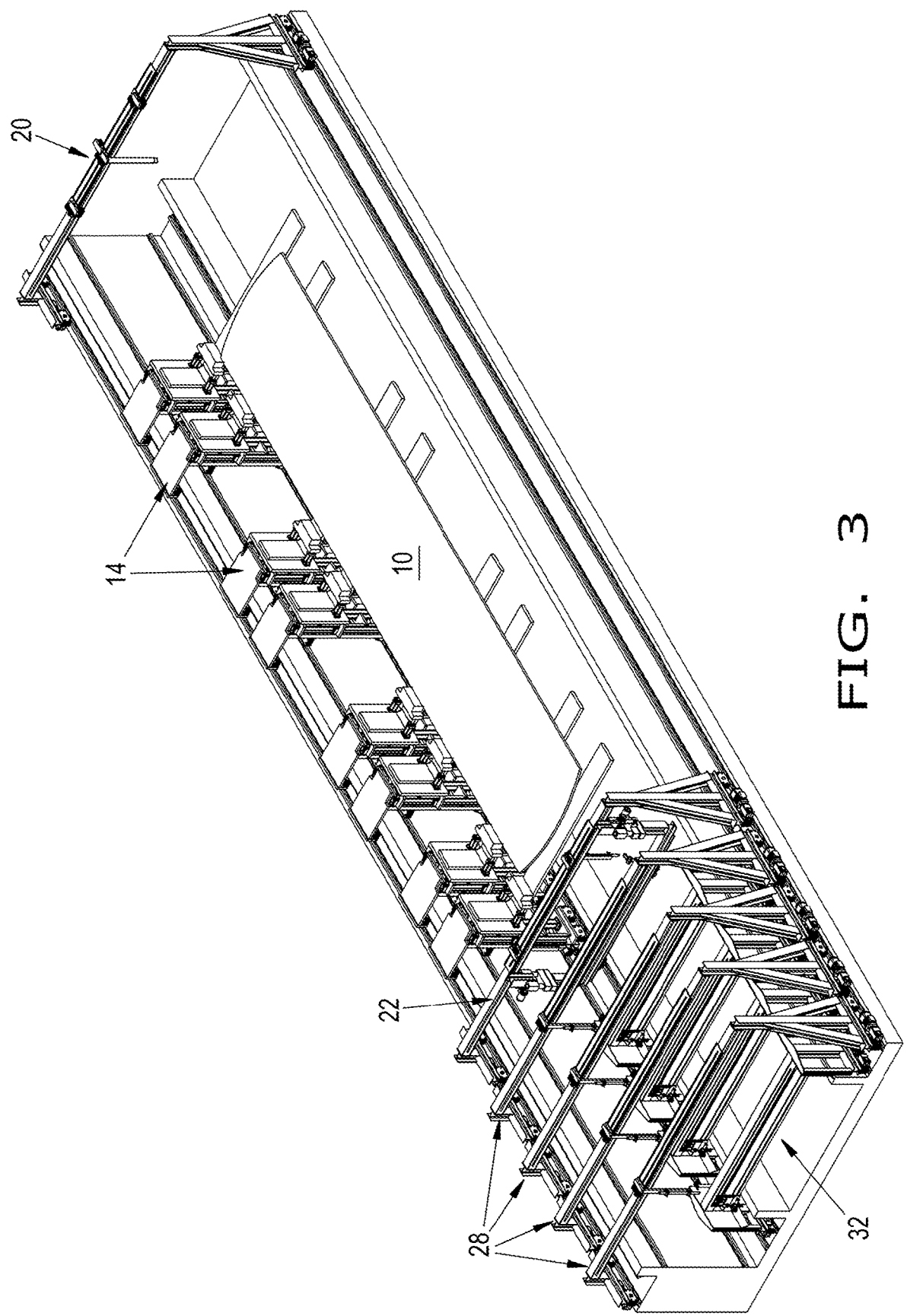
FIG. 3 is a perspective view showing the steel plate of FIGS. 2A and 2B raised and in position for undergoing cutting and deburring operations.
Figure 4:
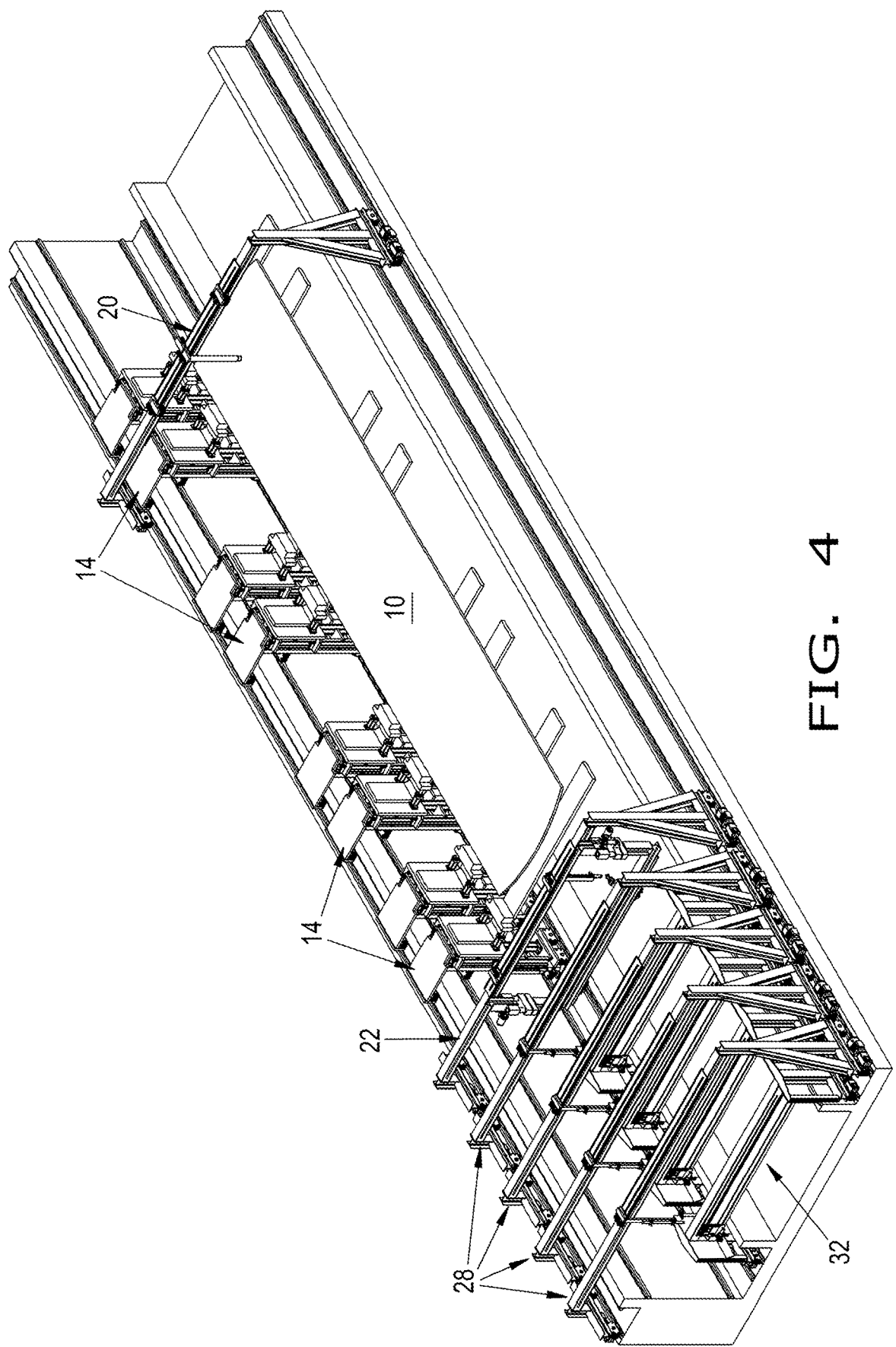
FIG. 4 is a perspective view showing the plate of FIGS. 2A and 2B undergoing a scanning operation in preparation for the cutting operation.
Figure 11:
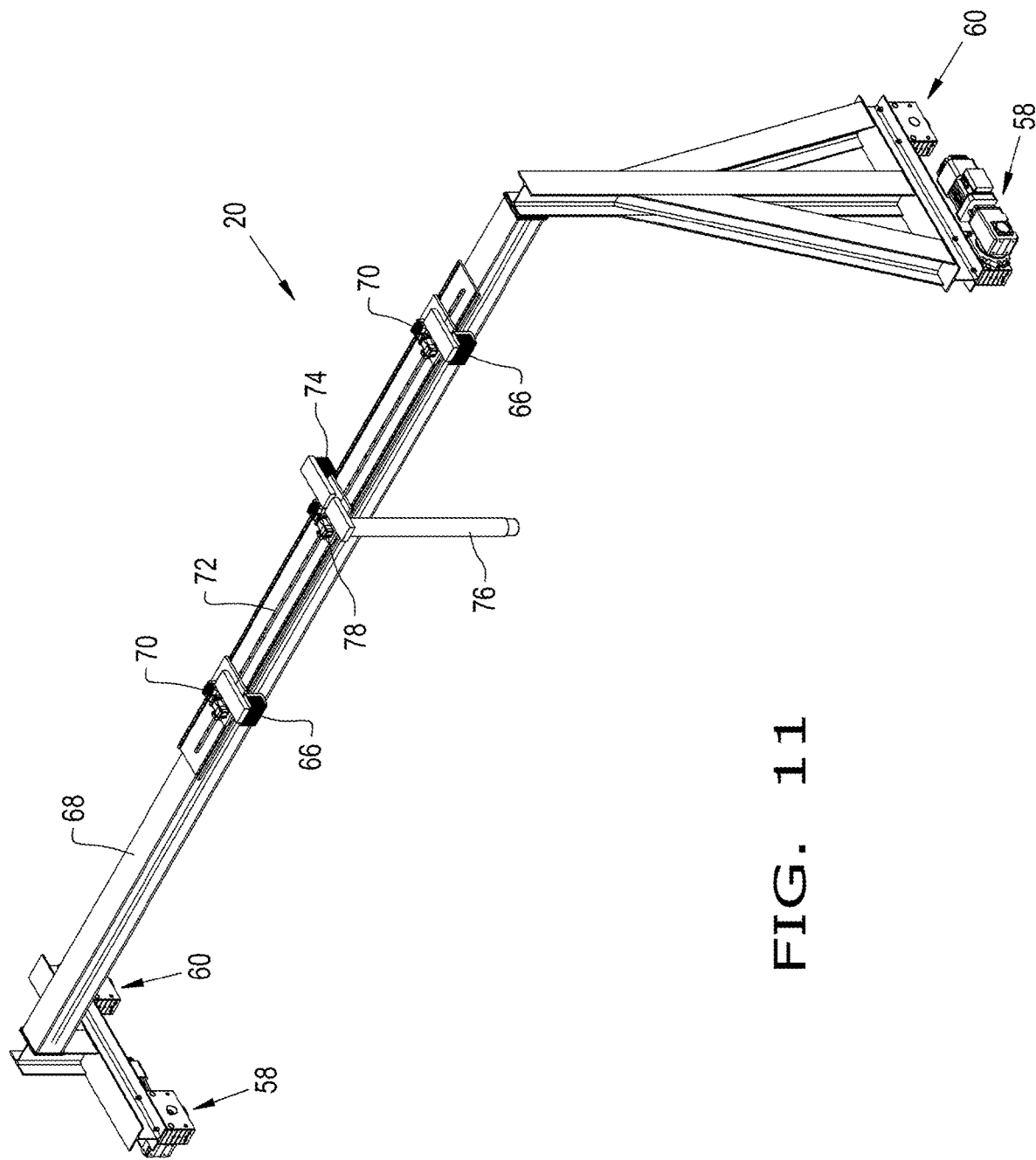
FIG. 11 represents various different views of a scanning unit of the cutting system shown in FIGS. 1 through 9.

Also in FIG. 1, the cutting system is shown to comprise a scanning unit 20 adapted to move along the X axes of the cutting system and plate 10 to perform a scan of the longitudinal and end edges of the plate 10 for the purpose of aiding in the accurate positioning of cutting torches (for example, oxy-fuel cutting torches) used to perform the desired longitudinal and cross cuts. As represented in FIG. 4, scanning is performed with the scanning unit 20 as the unit 20 moves from its home position (FIGS. 1 through 3) at one longitudinal end of the plate 10 to its opposite longitudinal end along the X axis of the plate 10. Suitable means for scanning the longitudinal and end edges of the plate 10 include lasers 66 and 74 (FIG. 11). According to preferred aspects of the invention, the scanning unit 20 is also equipped with a printing head 76 (FIG. 11) to perform a marking operation as the unit 20 returns to its home position and before any cutting operation is performed. The marking operation may entail marking the plate 10 or pieces cut from the plate 10 to indicate size, grade, and serial number. Further aspects of the scanning unit 20 can be appreciated from the various views shown in FIG. 11, discussed in more detail below.

The cutting system represented in FIG. 1 is equipped with one longitudinal cutting unit 22 (FIGS. 12A and 12B) equipped with two torches 24 and two deburring devices 26, four cross cutting units 28 (FIGS. 13A and 13B) each equipped with one torch 30, and four deburring carriages 32 (FIGS. 14A through 14C) each equipped with a deburring device 34 and configured to operate in combination with a corresponding one of the cross cutting units 28 while located beneath that cross cutting unit 28. A particular example of a suitable deburring device for use with the cutting units 22 and 28 is disclosed in U.S. Patent Application Publication No. 2017/0129119, whose contents are incorporated herein by reference. Further aspects of the cutting units 22 and 28 and deburring carriages 32 can be appreciated from the various views shown in FIGS. 11, 12A, 12B, 13A, and 13B, which are discussed in more detail below.

Figure 9:
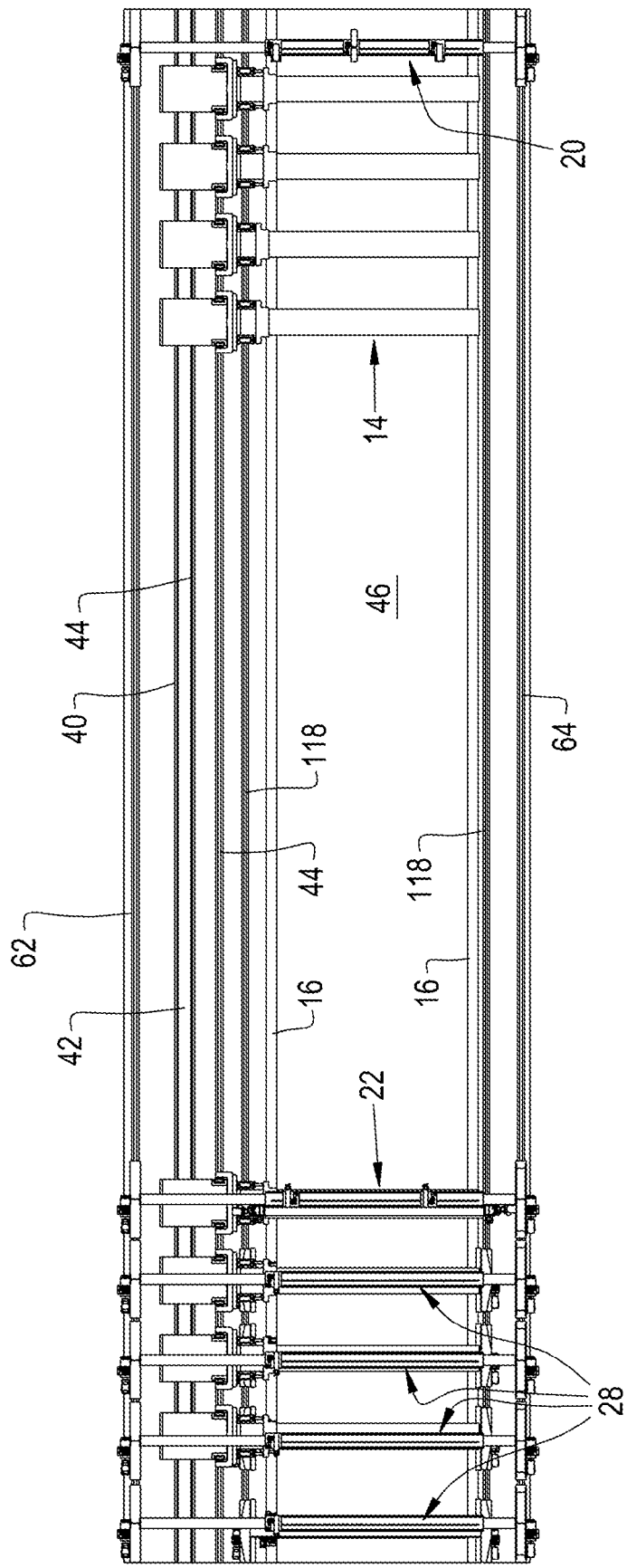
FIG. 9 is a top view showing the cutting system of FIGS. 1 through 8 following the removal of the plate from the cutting system and the cutting system configured for removal of debris generated during the cutting operations.
Figure 10:
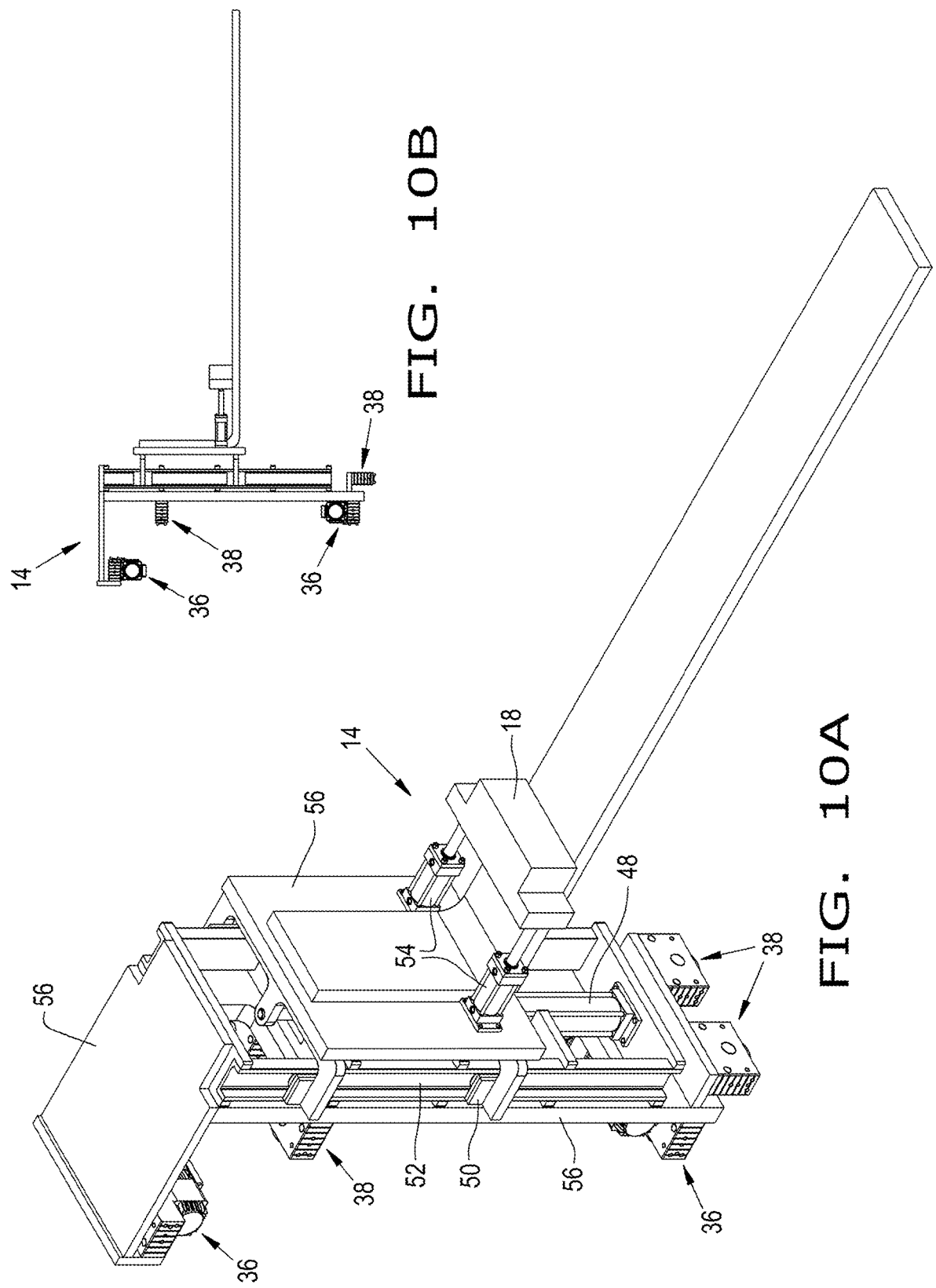
FIGS. 10A and 10B represent, respectively, perspective and side views of a support unit of the cutting system shown in FIGS. 1 through 9.

FIGS. 10A and 10B depict a representative example of the support units 14 shown in FIGS. 1 through 9. The support unit 14 is shown as equipped with two gear motor-driven wheel units 36 and a separate set of nondriven wheels 38 for facilitating the traveling motion of the support unit 14 along the X axes of the cutting system and plate 10 to enable each support unit 14 to be positioned relative to the longitudinal (X axis) length of the plate 10 and the locations of cross cuts to be made in the plate 10. The wheel units 36 engage separate tracks 40 located on opposite sides of an upper support wall 42 of the foundation 12, and the wheels 38 engage separate tracks 44 located on and adjacent the support wall 42 to provide additional support and stability. The wheel units 36 are preferably equipped with position sensors (not shown) such as encoders to accurately move and locate the support unit 14 along the X axis of the cutting system. A lifting mechanism 48, represented as a cylinder, cooperates with cams 50 that engage channels 52 to lift and guide the vertical (Z axis) motion of the support unit 14 along the Z axes of the cutting system and plate 10 to enable each support unit 14 to be positioned relative to the plate 10. As will be discussed below, the ability to raise the crossmember 15 and the material it supports is desired to create clearance for the deburring devices 26 of the longitudinal cutting unit 22. If the cutting system is adapted to cut relatively heavy material, such as a slab, a second lifting mechanism (not shown) may be added at the end of the crossmembers 15 opposite the support wall 42. A lateral (Y axis) translation mechanism 54, represented as a pair of cylinders, is attached to the bumper 18 for positioning the bumper 18 along the Y axes of the cutting system and plate 10 to enable the bumper 18 to be positioned to absorb shock as material is loaded onto the support unit 14. Thereafter, the mechanism 54 is operable to retract the bumper 18 away from the longitudinal edge of the material. Frame components 56 of the support unit 14 may be constructed of heavy plate to serve as a counterweight to the weight of the material supported by the crossmember 15.

The scanning unit 20 is represented in FIG. 11 as equipped with a translation system including two gear motor-driven wheel units 58 and a separate set of nondriven wheels 60 for facilitating the traveling motion of the unit 20 along the X axes of the cutting system and plate 10 to enable the unit 20 to traverse the longitudinal (X axis) length of the plate 10. Each wheel unit 58 is paired with one of the wheels 60, and each set of paired wheels 58 and 60 is engaged with either a track 62 located on the upper support wall 42 of the foundation 12 or with a separate track 64 adjacent one of the lower support walls 16 of the foundation 12 to provide support and stability. The wheel units 58 are preferably equipped with at least one position sensor (not shown) such as an encoder to accurately locate and move the unit 20 along the X axis. The unit 20 is represented as equipped with two of the aforementioned side lasers 66, each of which is mounted on a gantry 68 and motorized with a servomotor 70 to move along a rack 72 mounted on the gantry 68 to enable their positions to be adjusted to the width (Y axis) of the plate 10 to scan the longitudinal edges of the plate 10. The aforementioned printing head 76 and an overhead end scanning laser 74 are also mounted on the gantry 68 and motorized with a servomotor 78 to move along the rack 72 to accurately position the printing head 76 and laser 74 along the Y axis of the plate 10. The orientation of the laser 74 is vertical (Z axis) and therefore perpendicular to the side lasers 66, and in combination the lasers 66 and 74, translated by their respective servomotors 70 and 78, cooperate to scan the plate 10 locate the positions of the longitudinal and end edges of the plate 10 as the scanning unit 20 travels along the X axes of the cutting system and plate 10. The scanning unit 20 can additionally travel along the X axis of the plate 10 while translating and operating the printing head 76 along the Y axis of the plate 10 to generate markings on the plate 10 or on pieces cut from the plate 10 to indicate size, grade, and serial number of the plate/pieces.

Figures 12A, 12B:
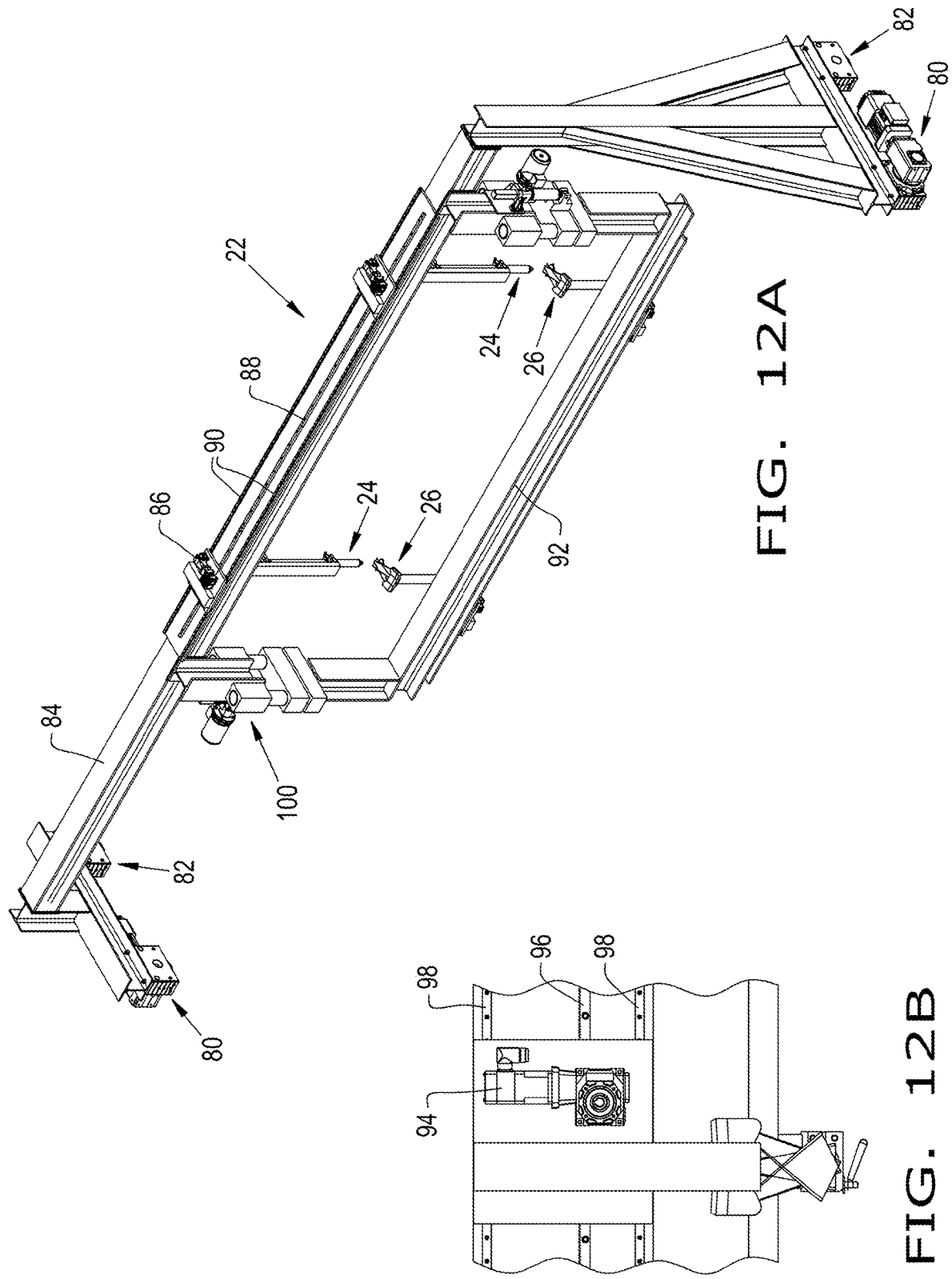
FIG. 12A represents a perspective view of a longitudinal cutting unit of the cutting system shown in FIGS. 1 through 9.
FIG. 12B is a detailed view of an assembly for synchronizing the positions of deburring devices on the longitudinal cutting unit to remove burrs from the longitudinal cuts as they are being made in the plate by the longitudinal cutting unit.

The longitudinal cutting unit 22 is represented in FIGS. 12A and 12B as equipped with a translation system that includes two gear motor-driven wheel units 80 and a separate set of nondriven wheels 82 for facilitating the traveling motion of the cutting unit 22 along the X axes of the cutting system and plate 10 to enable the cutting unit 22 to traverse the longitudinal (X axis) length of the plate 10 being cut. Each wheel unit 80 is paired with one of the wheels 82, and each set of paired wheels 80 and 82 is engaged with either the track 62 located on the upper support wall 42 of the foundation 12 or the track 64 adjacent one of the lower support walls 16 of the foundation 12 to provide support and stability. The wheel units 80 are equipped with at least one position sensor (not shown) such as encoders to accurately move the cutting unit 22 along the X axis of the cutting system as a longitudinal (X axis) cut is taking place. The torches 24 of the cutting unit 22 are each adapted to make one of the longitudinal cuts. Each torch 24 is mounted on an upper gantry 84 and positioned thereon via a servomotor 86, rack 88, and pinion (not shown) along a pair of linear guides 90 mounted on the gantry 84. The torches 24 are thus configured to be accurately located at the desired lateral (Y axis) locations for making longitudinal linear cuts, and whose positions can be automatically adjusted if the material to be cut is not parallel to the X axis of the cutting system, as ascertained by the scanning lasers 66 and 74. The servomotors 86 can also be controlled to enable the torches 24 to follow essentially any path along the plate 10, including nonlinear paths as may be desired for certain products.

Each deburring device 26 of the cutting unit 22 is mounted on a lower gantry 92 rigidly secured to and beneath the upper gantry 84 so that the plate 10 being cut by the torches 24 can pass therebetween. The position of each deburring devices 26 is synchronized to the position of a corresponding one of the torches 24 via a servomotor 94, rack 96, and pinion (not shown) along a pair of guides 98 mounted on the gantry 92. The elevation of each deburring devices 26 is independently adjustable with a jack screw 100 or other suitable mechanism. Each deburring devices 26 may be mounted with a rotating manifold, for example, as disclosed in U.S. Patent Application Publication No. 2017/0129119, to enable the deburring devices 26 to debur in any direction (e.g., in the X-Y plane). Such a capability is advantageous for producing nonlinear burr-free cuts, for example, to produce large articles such as gear racks of the type used in offshore oil rings.

Figures 13A, 13B:
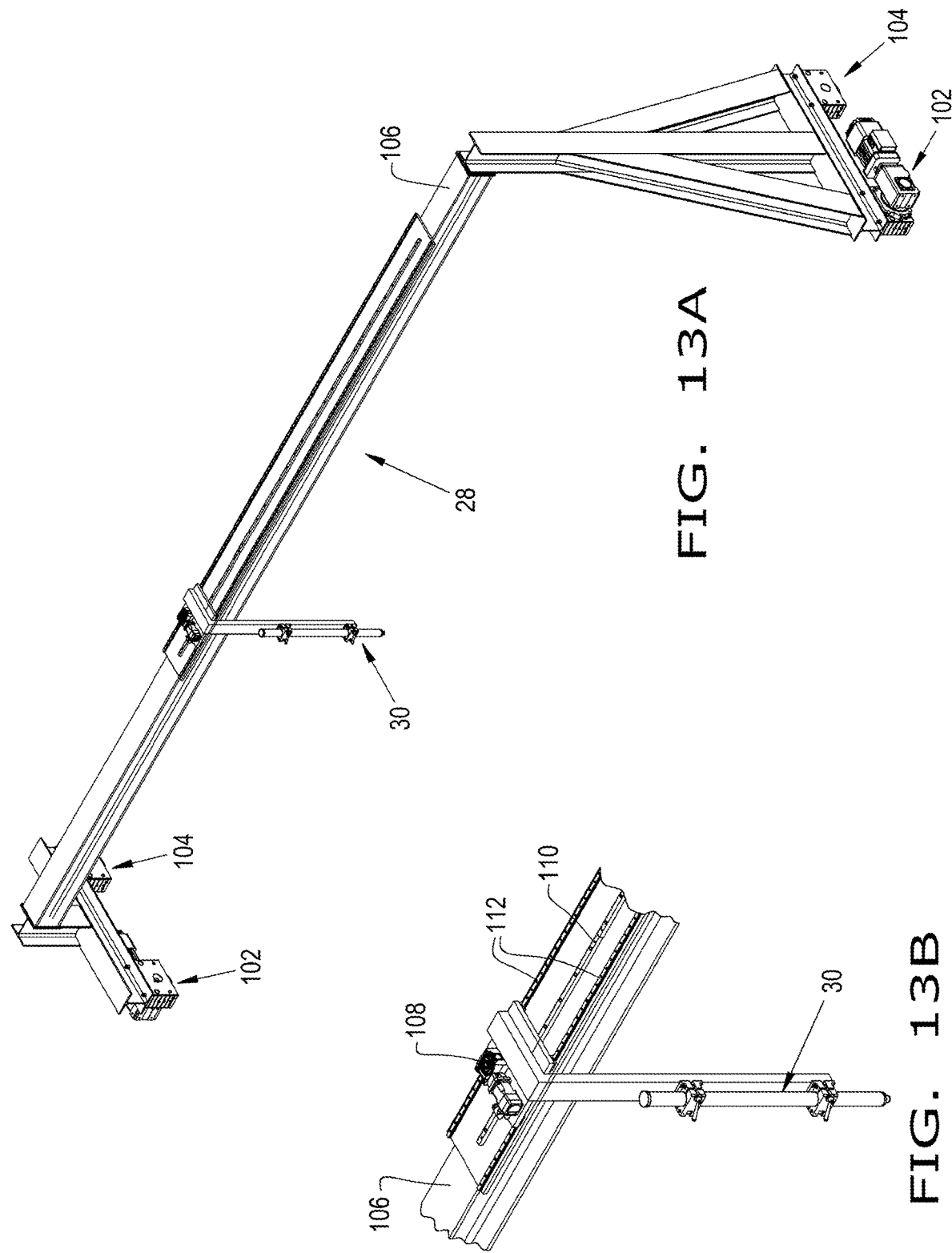
FIG. 13A represents a perspective view of a cross cutting unit of the cutting system shown in FIGS. 1 through 9.
FIG. 13B is a detailed view of an assembly for positioning a torch on the cross cutting unit.

FIGS. 13A and 13B depict a representative example of the cross cutting units 28 shown in FIGS. 1 through 9. The cross cutting unit 28 is represented as equipped with a translation system that includes two gear motor-driven wheel units 102 and a separate set of nondriven wheels 104 for facilitating the traveling motion of each unit 28 along the X axes of the cutting system and plate 10 to enable each unit 28 to be positioned relative to the longitudinal (X axis) length of the plate 10 and at locations where cross cuts are desired to be made in the plate 10. Each wheel unit 102 is paired with one of the wheels 104, and each set of paired wheels 102 and 104 is engaged with either the track 62 located on the upper support wall 42 of the foundation 12 or with the track 64 adjacent one of the lower support walls 16 of the foundation 12 to provide support and stability. The torch 30 is mounted on a gantry 106 and lateral (Y axis) cutting movement of the torch 30 is realized via a servomotor 108, rack 110, pinion (not shown) and guides 112 mounted on the gantry 106. The wheel units 102 are preferably equipped with position sensors (not shown) such as encoders to accurately move and locate the cutting unit 28 along the X axis of the cutting system to where a cross cut is to take place.

Figure 14A:
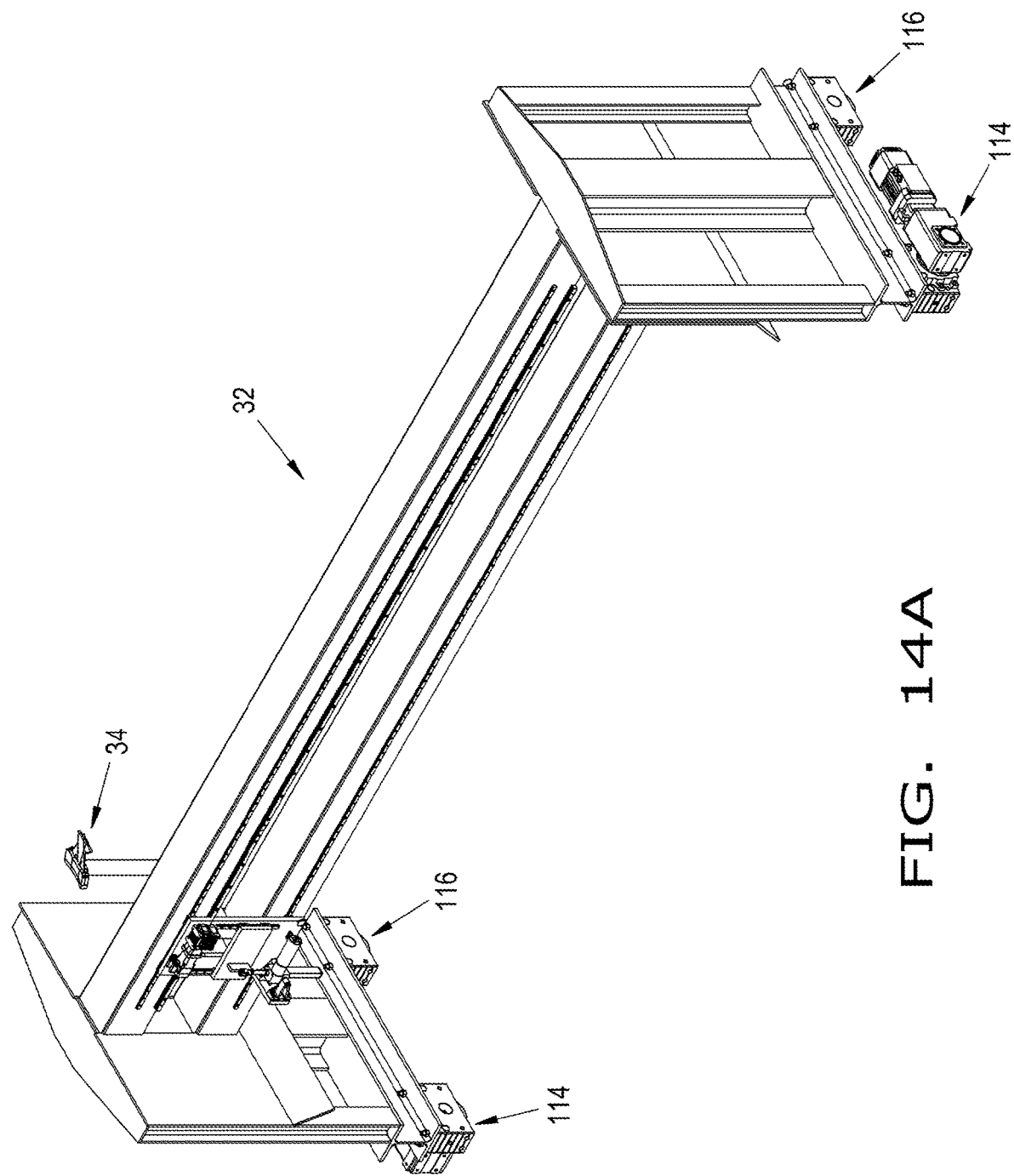
FIG. 14A represents a perspective view of a deburring carriage of the cutting system shown in FIGS. 1 through 9, and FIGS. 14B and 14C are detailed views of an assembly for positioning a deburring device on the deburring carriage to remove burrs from the lateral cuts as they are being made in the plate by the cross cutting unit.
Figure 14C:
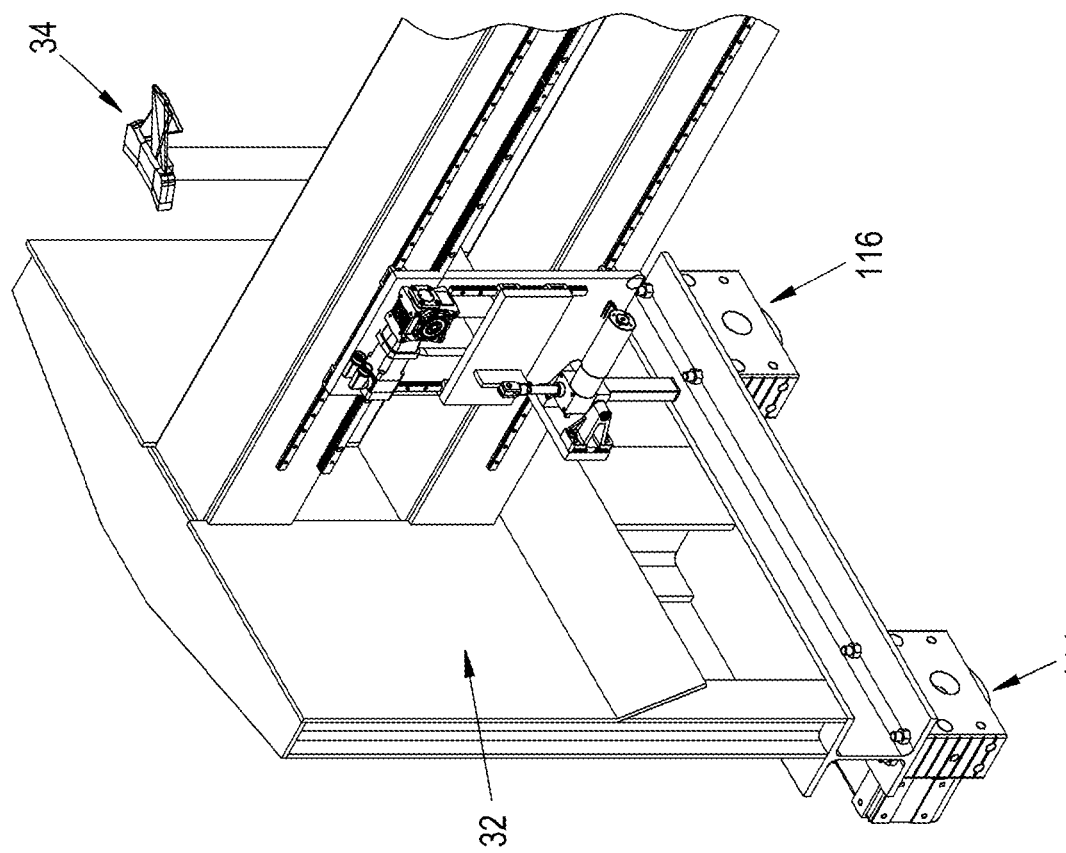
Figure 14B:
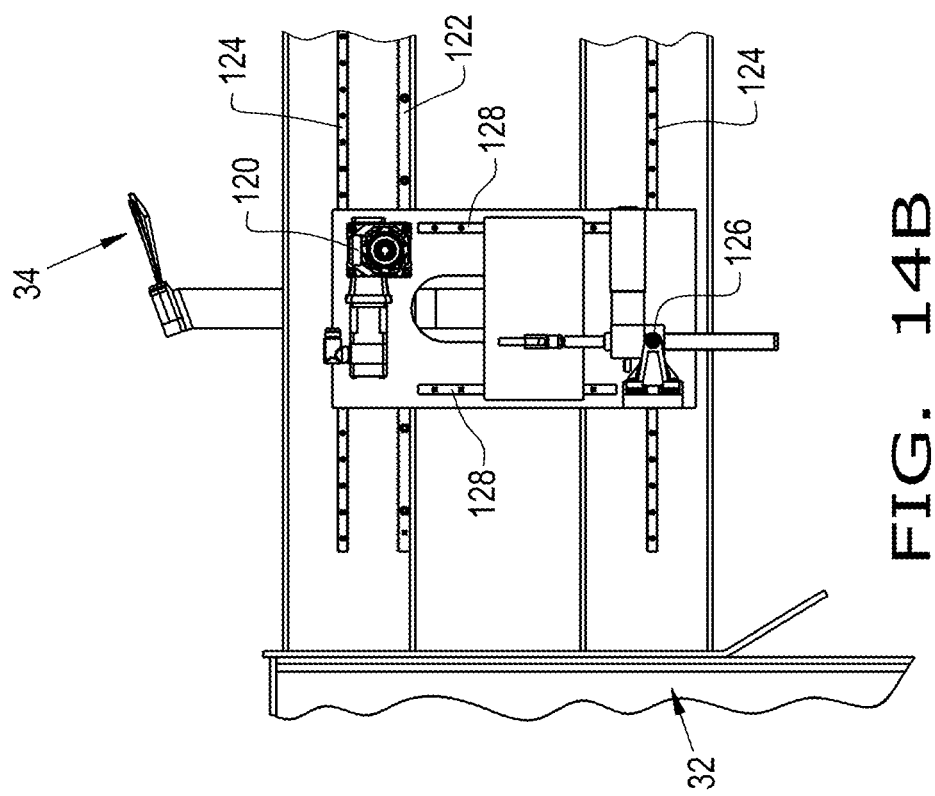

Similar to the longitudinal cutting unit 22, each cross cutting unit 28 operates in conjunction with a deburring device 34 that is mounted so that the plate 10 being cut by the corresponding cross cutting torch 30 can pass between the torch 30 and its associated deburring device 34. However, in contrast to the torches 24 and deburring devices 26 of the cutting unit 22, which are mounted to upper and lower gantries 84 and 92 that are rigidly connected together, each deburring device 34 is carried by a deburring carriage 32 that is completely separate from the cross cutting unit 28 carrying the associated cross cutting torch 30. The deburring carriage 32 is represented in FIGS. 14A through 14C as equipped with an independent translation system that includes two gear motor-driven wheel units 114 and a separate set of nondriven wheels 116. Each wheel unit 114 is paired with one of the wheels 116, and each set of paired wheels 114 and 116 is engaged with a pair of tracks 118, each located adjacent one of the other lower support wall 16 of the foundation 12, to provide support and stability. The wheel units 114 are preferably equipped with position sensors (not shown) such as encoders to accurately move and locate the carriage 32 along the X axis of the cutting system to align and position its deburring device 34 opposite its associated torch 30 making the cross cut. The lateral (Y axis) movement of the deburring device 34 is realized via servomotor 120, rack 122, pinion (not shown), and guides 124, and a jack screw 126 and guides 128 cooperate to accurately adjust the elevation of the deburring device 34.

Figure 15:
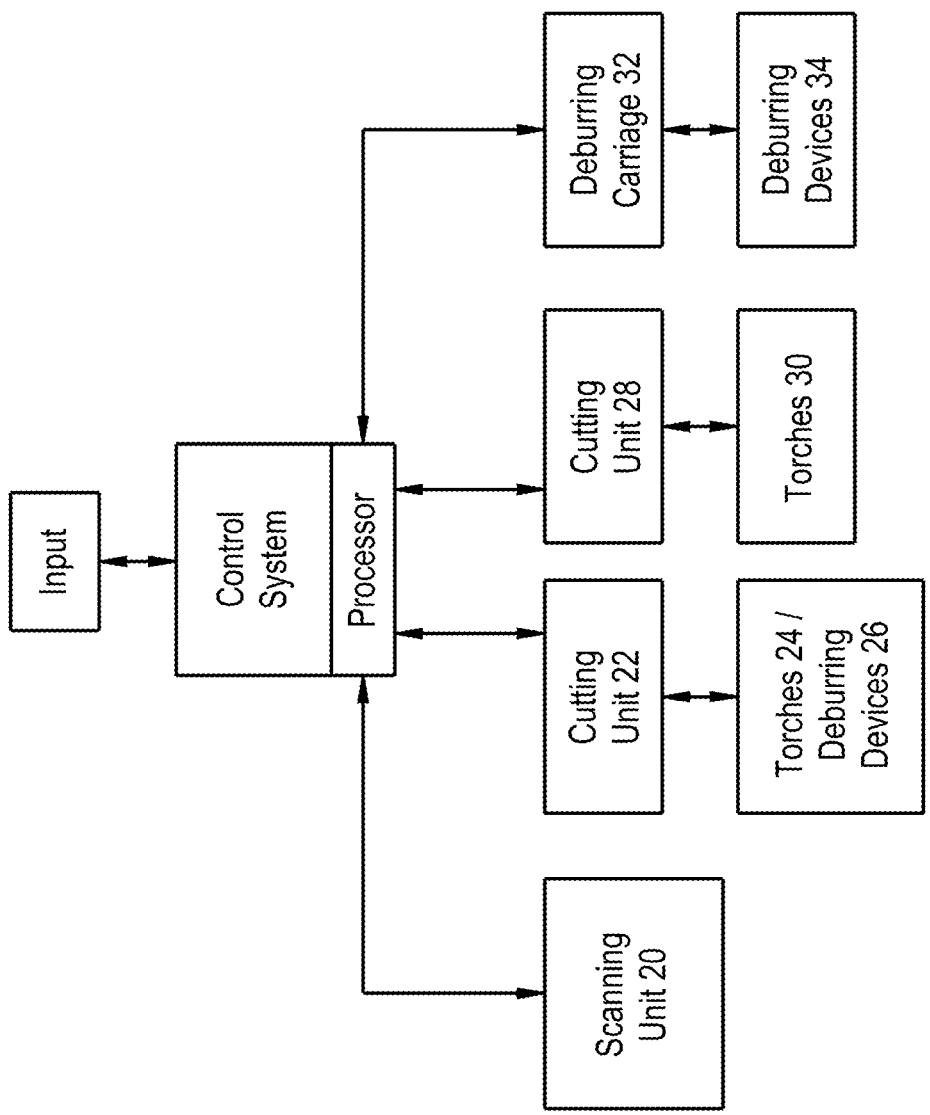
FIG. 15 is a diagram representing the interaction of various components that may be used to control the operations depicted in FIGS. 1 through 9.

FIG. 15 is a diagram representing the interaction of various components that may be used to control the operations depicted in FIGS. 1 through 9. In particular, a control system is represented in FIG. 15 as implemented by at least one processor (e.g., a microprocessor or other suitable processing device). The control system and its processor are operatively connected with the cutting system to collect data with the scanning unit 20 through its lasers 66 and 74, servomotors 70 and 78, and wheel units 58 can be used to identify the location of the plate 10 and its edges relative to the foundation 12. Such data can then be used to control the X axes positions of the cutting units 22 and 28 and deburring carriage 32 and control and synchronize the X and Y axes positions of their respective torches 24 and 30 and deburring devices 26 and 34 through their respective servomotors 86, 94, 108, and 120 (providing Y axis positional control) and wheel units, 80, 102, and 114 (providing X axis positional control). FIG. 15 also evidences that data can be input into the control system, for example, to identify the type and thickness of the plate to be cut, as well as the size(s) of one or more reduced-size pieces desired to be cut from the plate. From FIG. 15 it should be understood that quality control data can also be obtained by scanning the reduced-size pieces with the scanning unit 20 after the cutting and deburring operations have been completed to confirm that the pieces have been cut to their desired predetermined sizes.

The operation of the cutting system and its components described above can be generally described as follows. As generally represented in FIG. 1, with the scanning unit 20, the cutting units 22 and 28, and the deburring carriages 32 positioned in their home positions, the support units 14 and their respective crossmembers 15 and bumpers 18 are longitudinally positioned consistent with the size and weight of the plate 10 (or other material) to be cut. While the units 20, 22 and 28 and deburring carriages 32 remain in their home positions and preferably while the crossmembers 15 of the support units 14 rest on the lower support walls 16 of the foundation 12 (FIG. 1), the plate 10 can be placed on the crossmembers 15 after which the bumpers 18 of the support units 14 are retracted (FIGS. 2A and 2B). Simultaneously or thereafter, the crossmembers 15 are raised to lift the plate 10 off the lower support walls 16 in preparation for scanning the plate 10 (FIG. 3). If deemed appropriate or necessary, individual support units 14 can be moved along the X axis of the plate 10 to better position the crossmembers 15 for supporting the plate 10.

Scanning of the plate 10 is performed by translating the scanning unit 20 along the X axes of the cutting system and plate 10 (FIG. 4). During the scanning operation, the lasers 66 and 74 locate the positions of the longitudinal and end edges of the plate 10 as the scanning unit 20 travels along entire length of the plate 10. The scanning unit 20 can also be caused to travel the X axis of the plate 10 while translating and operating the printing head 76 along the Y axis of the plate 10 to mark the plate 10 or pieces cut from the plate 10 to indicate size, grade, and serial number of the plate/pieces.

Figure 5:
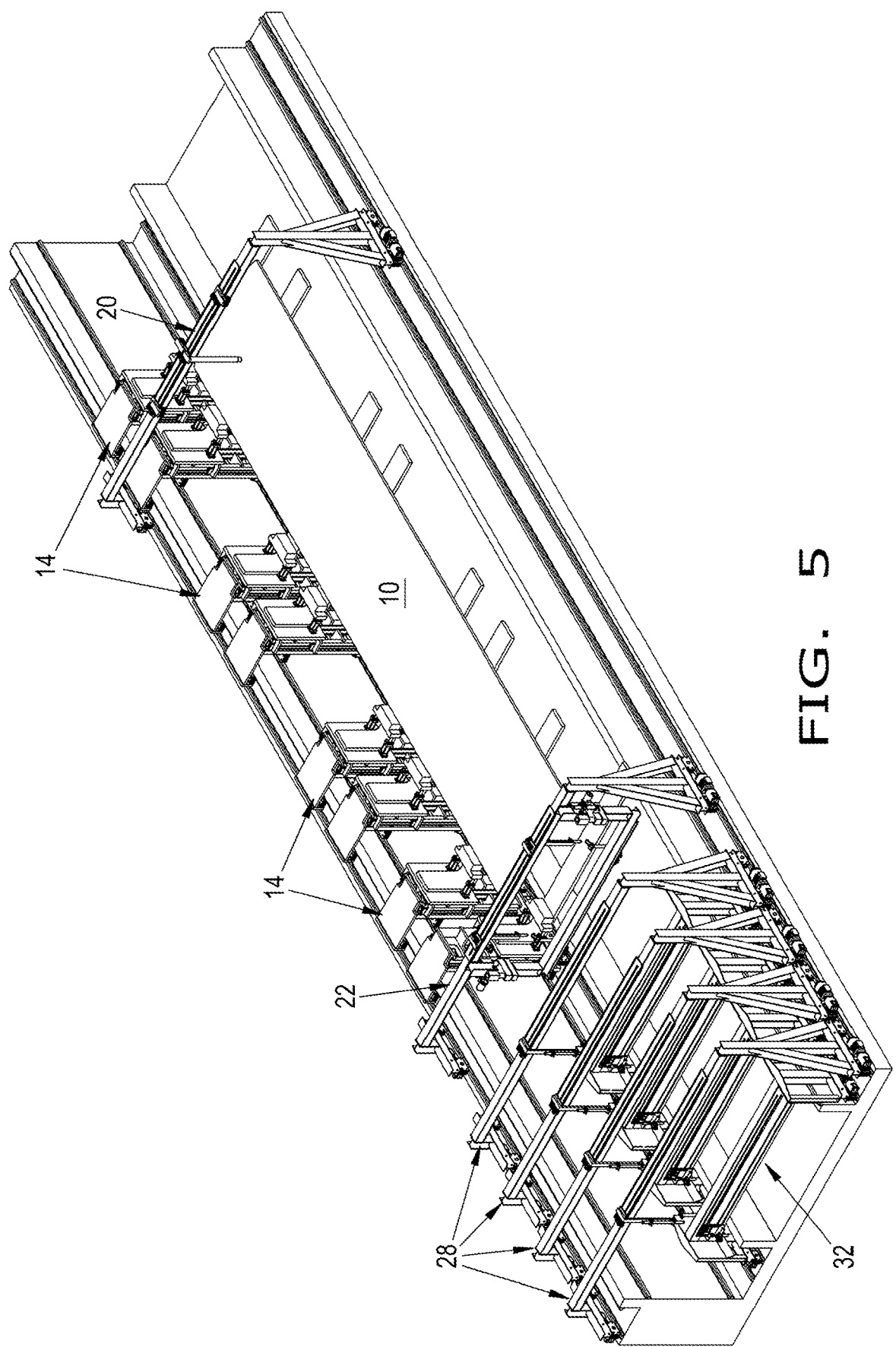
FIGS. 5, 6, and 7 are perspective views showing a partial sequence during which the plate of FIGS. 2A and 2B is undergoing longitudinal cuts to simultaneously remove material from the longitudinal edges of the plate.

After the scanning unit 20 has returned to its home position (FIG. 5), the longitudinal and lateral cutting operations are performed with the longitudinal cutting unit 22 and cross cutting units 28, respectively. The longitudinal cutting operation is initiated by longitudinally moving the cutting unit 22 along the X axis of the cutting system toward the plate 10, during which time its torches 24 and deburring devices 26 are able to automatically adjust to the longitudinal edge cutting positions desired for the plate 10. As depicted in FIGS. 5, 6, and 7, during the making of the longitudinal edge cuts, as the cutting unit 22 approaches each support unit 14 the crossmember 15 of that support unit 14 is lowered to allow clearance for the deburring devices 26 of the cutting unit 22 between the plate 10 and the crossmember 15, and once the cutting unit 22 has passed the support unit 14 its crossmember 15 is raised to again support the plate 10. The sequence of lowering and raising the cross supports 15 as the cutting unit 22 approaches and passes each support unit 14 continues until the longitudinal edge cuts have been completed on the plate 10, at which point the cutting unit 22 is located next to the scanning unit 20, where the unit 22 may remain until the cross cuts have been completed with the cross cutting units 28.

As represented in FIG. 8, the cross cuts are performed with the cross cutting units 28 and the corresponding deburring carriages 32 positioned in pairs along the longitudinal length of the plate 10 where cross cuts are desired. Each cross cut can be performed simultaneously by laterally translating the torch 30 of each cutting unit 28 while also synchronously laterally translating the deburring device 34 of its corresponding deburring carriage 32. One of the cross cutting units 28 may be operated to perform a sample cut on the plate 10, for example, from the end of the plate 10 farthest from the scanning unit 20. It should be noted that at any time during any of the cutting operations, any one or more of the support units 14 can be moved along the X axis of the plate 10 to position the crossmembers 15 away from the cuts being made in the plate 10. Suitable positions for the support units 14 can be identified based on data collected for the longitudinal and end edge locations with the lasers 66 and 74 during the scanning operation.

At the completion of the cross cuts, the cross cutting units 28 and their associated deburring carriages 32 can be returned to their home positions depicted in FIGS. 1 through 7, after which the support units 14 can be operated to lower their crossmembers 15 onto the lower support walls 16 for unloading plate 10 (or pieces thereof) from the cutting system. After unloading, the support, scanning, and cutting units 14, 20, 22, and 28 and the deburring carriages 32 are preferably positioned as depicted in FIG. 9 to facilitate removal of debris generated during the cutting operations that has collected in a pit 46 located between the support walls 16 of the foundation 12. The cutting system is then ready for the next material to be cut.

While the invention has been described in terms of a particular embodiment, it should be apparent that alternatives could be adopted by one skilled in the art. For example, the cutting system and its components could differ in appearance and construction from the embodiment described herein and shown in the drawings, functions of certain components of the cutting system could be performed by components of different construction but capable of a similar (though not necessarily equivalent) function, and various materials could be used in the fabrication of the cutting system and its components. In addition, the invention encompasses additional or alternative embodiments in which one or more features or aspects of the disclosed embodiment could be eliminated. Accordingly, it should be understood that the invention is not necessarily limited to any embodiment described herein or illustrated in the drawings. It should also be understood that the phraseology and terminology employed above are for the purpose of describing the illustrated embodiment, and do not necessarily serve as limitations to the scope of the invention. Therefore, the scope of the invention is to be limited only by the following claims.

The invention claimed is:

1. An automated cutting system for reducing the size of a material by making cuts in X-axis and Y-axis directions of the material, the automated cutting system comprising:
    a foundation having a longitudinal direction along an X axis of the automated cutting system and corresponding to the X-axis direction of the material, a lateral direction along a Y axis of the automated cutting system and corresponding to the Y-axis direction of the material, a vertical direction along a Z axis of the automated cutting system, and at least a first support wall disposed in the longitudinal direction of the foundation;
    multiple support units aligned in the longitudinal direction of the foundation, the support units being independently translatable in the longitudinal direction and each of the support units comprising a crossmember that extends in the lateral direction, is adapted to at least partially support the material, and is independently operable to be raised and lowered in the vertical direction so that the crossmembers are independently operable to support the material in raised positions of the support units and independently operable so that individual crossmembers of the crossmembers can be lowered to create a clearance with the material and not support the material while the material is supported by others of the crossmembers, the first support wall of the foundation being positioned relative to the support units so that the crossmembers thereof rest on the first support wall in lowermost positions of the support units and are raised off of the first support wall in the raised positions of the support units;
    at least one longitudinal cutting unit translatable in the longitudinal direction and comprising at least one torch adapted for performing a longitudinal cut in the material along the X axis thereof while the material is supported by the crossmembers of the support units; and
    at least one cross cutting unit translatable in the longitudinal direction and comprising at least one torch adapted for performing a lateral cut in the material along the Y-axis thereof while the material is supported by the crossmembers of the support units.

2. The automated cutting system of claim 1, the automated cutting system further comprising deburring means associated with the longitudinal cutting unit for simultaneously deburring the longitudinal cut as the longitudinal cut is being produced, the deburring means being operable to pass through the clearance between the material and the individual crossmembers when the individual crossmembers have been lowered to create the clearances thereof with the material.

3. The automated cutting system of claim 2, wherein the deburring means is translatable with the longitudinal cutting unit.

4. The automated cutting system of claim 2, wherein the deburring means is mounted to the longitudinal cutting unit for translation therewith.

5. The automated cutting system of claim 4, wherein the torch and the deburring means of the longitudinal cutting unit are mounted on separate upper and lower gantries, respectively, that are rigidly secured to each other and vertically spaced apart so that the material being cut by the torch of the longitudinal cutting unit can pass therebetween.

6. The automated cutting system of claim 4, wherein the deburring means of the longitudinal cutting unit are mounted with a rotating manifold to enable the deburring means to debur in any direction within an X-Y plane of the material.

7. The automated cutting system of claim 2, further comprising means for synchronizing the positions of the deburring means and the torch of the longitudinal cutting unit.

8. The automated cutting system of claim 1, the automated cutting system further comprising deburring means associated with the cross cutting unit for simultaneously deburring the lateral cut as the lateral cut is being produced.

9. The automated cutting system of claim 8, wherein the deburring means associated with the cross cutting unit is translatable in the longitudinal direction of the foundation and also translatable in the lateral direction of the foundation and in the Y-axis direction of the material.

10. The automated cutting system of claim 9, wherein the deburring means associated with the cross cutting unit is not mounted to the cross cutting unit.

11. The automated cutting system of claim 10, wherein the deburring means associated with the cross cutting unit is mounted on a carriage that is separate from the cross cutting unit and is vertically spaced apart from the torch of the cross cutting unit so that the material being cut by the torch of the cross cutting unit can pass therebetween.

12. The automated cutting system of claim 8, further comprising means for synchronizing the position of the torch of the cross cutting unit and the position of the deburring means associated with the cross cutting unit.

13. The automated cutting system of claim 1, further comprising a scanning unit translatable in the longitudinal direction of the foundation independently of the longitudinal cutting unit and the cross cutting unit.

14. The automated cutting system of claim 13, wherein the scanning unit further comprises means for marking the material.

15. The automated cutting system of claim 13, further comprising a control system, implemented by at least one processing device and operatively connected to the automated cutting system to collect positional data from the scanning unit and to control the X and Y axes positions of the torches of the longitudinal and cross cutting units during the longitudinal and cross cuts performed thereby.

16. The automated cutting system of claim 1, further comprising a bumper on each of the support units, the bumper being adapted for movement along the Y-axis direction of the material to absorb impacts from the material being loaded and unloaded from the automated cutting system.

17. The automated cutting system of claim 16, wherein the bumper of each support unit is extendable and retractable in the lateral direction along the Y axis of the automated cutting system.

18. A method of operating an automated cutting system to reduce the size of a material by making cuts in X-axis and Y-axis directions of the material and produce at least one reduced-size piece therefrom, the method comprising:
providing a foundation having a longitudinal direction along an X axis of the automated cutting system and corresponding to the X-axis direction of the material, a lateral direction along a Y axis of the automated cutting system and corresponding to the Y-axis direction of the material, a vertical direction along a Z axis of the automated cutting system, and at least a first support wall disposed in the longitudinal direction of the foundation;
translating support units in the longitudinal direction;
lowering crossmembers of the support units to rest on the first support wall of the foundation;
placing the material on the crossmembers;
raising the material by lifting the crossmembers off the first support wall;
translating a longitudinal cutting unit in the longitudinal direction while making a longitudinal cut with a first torch in the Y-axis direction of the material while the material is supported by the crossmembers of the support units, individual crossmembers of the crossmembers being independently and individually lowered to create clearances with the material in sequence as the longitudinal cutting unit approaches and passes the support units associated with the individual crossmembers; and
translating a cross cutting unit in the longitudinal direction and then making a cross cut with a second torch in the X-axis direction of the material while the material is supported by the crossmembers of the support units.

19. The method of claim 18, wherein the automated cutting system further comprises a scanning unit translatable in the longitudinal direction of the foundation independently of the longitudinal cutting unit and the cross cutting unit, the method further comprising collecting positional data from the scanning unit and using the data to control the X and Y axes positions of the first and second torches of the longitudinal and cross cutting units during the longitudinal and cross cuts performed thereby.

20. The method of claim 18, further comprising inputting data to identify a type and thickness of the material to be cut and a predetermined size of the at least one reduced-size piece to be cut from the material.

21. The method of claim 18, wherein the automated cutting system further comprises a scanning unit translatable in the longitudinal direction of the foundation independently of the longitudinal cutting unit and the cross cutting unit, the method further comprising obtaining quality control data by scanning the at least one reduced-size piece with the scanning unit after the longitudinal and lateral cuts have been performed to confirm that a predetermined size of the at least one reduced-size piece has been produced.

22. The method of claim 18, wherein the longitudinal and lateral cuts are entirely linear cuts.

23. The method of claim 18, wherein at least one of the longitudinal or lateral cuts is a nonlinear cut.

24. The method of claim 18, wherein the material is a plate or a slab.

* * * * *